US012705105B2

(12) United States Patent
Samuel et al.

(10) Patent No.: US 12,705,105 B2
(45) Date of Patent: Aug. 11, 2026

(54) ARTIFICIAL INTELLIGENCE (AI) WORKLOAD SHARING SYSTEM AND METHOD OF USING THE SAME

(71) Applicant: Dell Products, L.P., Round Rock, TX (US)

(72) Inventors: Balasingh Ponraj Samuel, Round Rock, TX (US); Nikhil Manohar Vichare, Austin, TX (US); Jacob Vincent Mink, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1281 days.

(21) Appl. No.: 17/182,692

(22) Filed: Feb. 23, 2021

(65) Prior Publication Data

US 2022/0269537 A1 Aug. 25, 2022

(51) Int. Cl.

| | |
|---|---|
| ***G06F 9/50*** | (2006.01) |
| ***G06F 11/34*** | (2006.01) |
| ***G06N 5/04*** | (2023.01) |
| ***G06N 20/00*** | (2019.01) |

(52) U.S. Cl.

CPC ............ *G06F 9/505* (2013.01); *G06F 9/5055* (2013.01); *G06F 9/5088* (2013.01); *G06N 5/04* (2013.01); *G06N 20/00* (2019.01); *G06F 11/3428* (2013.01)

(58) Field of Classification Search

CPC ...... G06F 9/505; G06F 9/5055; G06F 9/5088; G06F 11/302; G06F 11/3409; G06F 11/3428; G06F 2201/81; G06F 2201/865; G06N 5/04; G06N 20/00

See application file for complete search history.

(56) References Cited

U.S. PATENT DOCUMENTS

| | | | | |
|---|---|---|---|---|
| 2010/0169253 | A1* | 7/2010 | Tan | G06F 9/5088 706/21 |
| 2020/0104184 | A1* | 4/2020 | Subramanian | G06N 3/04 |
| 2020/0296155 | A1* | 9/2020 | McGrath | G06F 9/5027 |
| 2020/0301743 | A1* | 9/2020 | Moustafa | G06F 9/5044 |
| 2021/0004252 | A1* | 1/2021 | Liu | G06N 20/00 |
| 2021/0144517 | A1* | 5/2021 | Guim Bernat | H04L 9/3247 |
| 2021/0365804 | A1* | 11/2021 | Nimmagadda | G06N 3/105 |
| 2022/0004428 | A1* | 1/2022 | Sun | G06F 9/4875 |

OTHER PUBLICATIONS

"Dell Precision Optimizer (DPO)", White Paper, 2017, Dell Inc., accessed online Jul. 26, 2025 at https://i.dell.com/sites/csdocuments/Business_solutions_whitepapers_Documents/ru/ru/dell-precision-optimizer_ru.pdf (Year: 2017).*

* cited by examiner

*Primary Examiner* — James D. Rutten

(74) *Attorney, Agent, or Firm* — Fogarty LLP

(57) ABSTRACT

According to one illustrative, non-limiting embodiment, a first IHS may include computer-executable instructions for performing at least one artificial intelligence (AI) service to optimize a performance of the first IHS. In response to determining that an AI workload of the AI service exceeds a specified threshold, the first IHS selects a second IHS to perform at least a portion of the AI workload, and transmits the at least one portion of the AI workload to the second IHS. When a processed AI workload is received from the second IHS, the first IHS applies one or more profile recommendations included in the processed AI workload.

21 Claims, 6 Drawing Sheets

ARTIFICIAL INTELLIGENCE (AI) WORKLOAD SHARING SYSTEM AND METHOD OF USING THE SAME

FIELD

The present disclosure relates generally to Information Handling Systems (IHSs), and more particularly, to an artificial intelligence (AI) workload sharing system and method of using the same.

BACKGROUND

Machine learning systems analyze data and establish models to make predictions and decisions. Examples of machine learning tasks include classification, regression and clustering. A predictive engine is a machine learning system that typically includes a data processing framework and one or more algorithms trained and configured based on collections of data. Such predictive engines are deployed to serve prediction results upon request. A simple example is a recommendation engine for suggesting a certain number of products to a customer based on pricing, product availabilities, product similarities, current sales strategy, and other factors. Such recommendations can also be personalized by taking into account user purchase history, browsing history, geographical location, or other user preferences or settings. Some existing tools used for building machine learning systems include Apache Spark Mllib, Apache Mahout, and Scikit-Learn.

Machine learning algorithms may be classified by how they are trained. For example, supervised learning, unsupervised learning, semi-supervised learning, and reinforcement learning may include several examples of various training techniques. Training data is used for training the machine learning algorithm. A machine learning model is a result of what is learned from training with the training data, and contains a parameter set for the machine learning algorithm. Neural networks may be used in machine learning. Neural networks may be used in the supervised learning and reinforcement learning space. The effectiveness of a machine learning algorithm is influenced by its accuracy, execution time, storage requirements, and the quality of the training data. The expertise and expense required for compiling a representative training set and labeling the data results in the training data and model obtained from the training data are valuable assets.

A typical machine learning workflow may include building a model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, validation set, and/or test set can respectively include pairs of input datasets and expected output datasets that correspond to the respective input datasets.

SUMMARY

According to one illustrative, non-limiting embodiment, a first IHS may include computer-executable instructions for performing at least one artificial intelligence (AI) service to optimize a performance of the first IHS. In response to determining that an AI workload of the AI service exceeds a specified threshold, the first IHS selects a second IHS to perform at least a portion of the AI workload, and transmits the at least one portion of the AI workload to the second IHS. When a processed AI workload is received from the second IHS, the first IHS applies one or more profile recommendations included in the processed AI workload.

According to another embodiment, an IHS-based method includes performing at least one artificial intelligence (AI) service to optimize a performance of the first IHS. In response to determining that an AI workload of the AI service exceeds a specified threshold, selecting a second IHS to perform at least a portion of the AI workload, and transmitting the at least one portion of the AI workload to the second IHS. The method further includes receiving a processed AI workload from the second IHS, and applying one or more profile recommendations included in the processed AI workload.

According to yet another embodiment, a memory storage device of an IHS may include instructions for performing at least one artificial intelligence (AI) service to optimize a performance of the first IHS. In response to determining that an AI workload of the AI service exceeds a specified threshold, the first IHS selects a second IHS to perform at least a portion of the AI workload, and transmits the at least one portion of the AI workload to the second IHS. When a processed AI workload is received from the second IHS, the first IHS applies one or more profile recommendations included in the processed AI workload.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
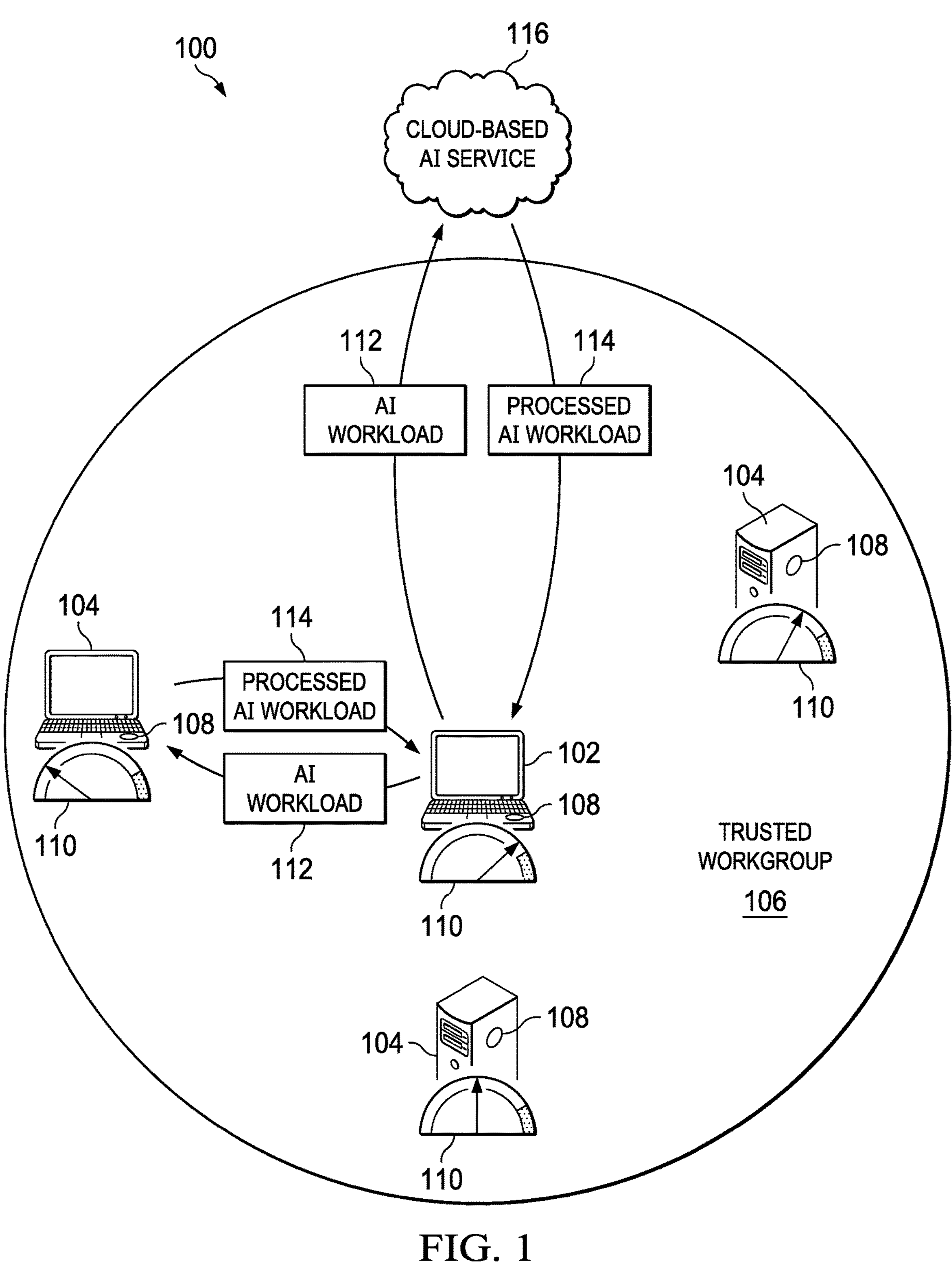
FIG. 1 illustrates one such example AI workload sharing system that may be implemented on a group of IHSs according to one embodiment of the present disclosure.

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information.

Nevertheless, a continually growing number of IHSs are being managed or enhanced using AI services, such as heuristic learning, machine learning (ML), deep learning (DL), reinforcement learning (RL) services, and the like. Certain latest IHS product offerings, such as a DELL LATITUDE 9510™ platform, for example, may include five AI services for optimizing battery runtime/charging intelligence, application performance, and system health that integrated with two different applications, namely DELL OPTIMIZER™ and DDV-SUPPORT ASSIST™, which are both installed and configured in the IHS. It is expected that in the future, AI services will be managing several additional aspects of IHSs including audio, network, collaboration, and privacy. Currently, most AI inference is performed on central processing units (CPUs), graphics processing units (GPUs), system on chips (SOCs), or other processors of the IHS. As the number of AI services increase, so will the need for computing resources to execute these models. Nevertheless, executing AI services in the IHS (e.g., on-the-box (OTB)) can inadvertently affect end-user productivity and negatively exhibit adverse affects, such as reduced battery life, system performance, and overall customer experience.

Conventional techniques to address these problems include AI hardware accelerators, AI software accelerators, and hosting AI services from the cloud (e.g., Internet hosted services). While there has been a growing trend to run the AI services on AI accelerators (GPU, VPU, SOC, etc.), these AI accelerators can be expensive and thus, may not get integrated on low-cost platforms. Regarding AI software accelerators, tools such as OPEN VINO™ provide an optimized representation of a Neural Network for resource-efficient inference. However, these tools do not support all DL architectures, and the real gain is, in many cases, only after using a HW accelerator.

While hosting AI services on the cloud may seem appealing, this option may be unfeasible for large commercial customers, especially when the AI service is hosted on the service provider's cloud (e.g., Dell cloud for Support Assist or Optimizer use cases) mainly due to security and privacy concerns. As such, several limitations exist to conventional approaches for resolving the issue of performing AI services on computing resources having inherently limited resources. Accordingly, embodiments of the present disclosure an AI service load sharing system and method are provided in which AI workloads may be migrated to other IHSs within a networked group of IHSs, such as a trusted workgroup of an organization.

FIG. 1 illustrates one such example AI workload sharing system 100 that may be implemented on a group of IHSs according to one embodiment of the present disclosure. The AI workload sharing system 100 generally includes a target IHS 102 along with other IHSs 104 that are configured in a communication network, such as a local area network (LAN). According to embodiments of the present disclosure, the target IHS 102 executes one or more artificial intelligence (AI) services 108 to optimize a performance of the target IHS 102. In response to determining that an AI processing load 110 of the target IHS 102 exceeds a specified level or threshold, the target IHS 102 selects another IHS 104, and transmits at least a portion of an AI workload 112 to the other IHS 104. At a later point in time, the target IHS 102 receives a processed AI workload 114 from the other IHS 104. The processed AI workload 114 includes one or more profile recommendations (e.g., inferences) that may be applied for optimizing a performance of the target IHS 102. Additionally, a cloud-based AI service 108' is provided that, in the event that one of the other IHSs 104 cannot provide the requested service, the AI workload 112 may then be transmitted to the cloud-based AI service 108 for its processing.

In one embodiment, the group of IHSs may include a trusted workgroup 106 configured in a trusted peer network. The trusted workgroup 106 configured in a trusted peer network may be particularly beneficial in that it can be created by IT administrators based on machines on the domain network using certain factors such as IHSs configured with similar AI services (e.g., Dell OPTIMIZER™ and DDV-SUPPORT ASSIST™, etc.). Hence the AI services 108 to most or all IHSs in the trusted workgroup are already available. Additionally, trusted workgroups, in many cases, are deployed in relatively close proximity, meaning that they can be managed locally by IT personnel, and may not be burdened by data throughput (e.g., bandwidth) issues often associated with distally located IHSs. Low-end and high-end hardware IHS configurations can also easily be fitted to provide workload sharing.

The AI workload 112 generally refers to data associated with an AI service that is to be performed for generating one or more inferences based on the data. For example, an AI workload 112 may include a set of input data (e.g., telemetry data, past profile recommendations, machine learning hints from other AI services, etc.) that may be processed to generate one or more inferences (e.g., profile recommendations). The AI processing load 110 generally refers to a level or amount of processing resources that are consumed by a processing device (e.g., CPU, GPU, SOC, VPU, etc.) of the each IHS 102, 104.

In general, computer networks are considered to be trusted according to the following rules: a. by default, provisioned IHSs under the purview of an organization's IT department are trusted by each other for many corporate IHS users, and b. by default, multiple systems registered with the same account are considered to be trusted for non-corporate users. IT administrators have the ability to create smaller groups within their organization (e.g., engineering laptops, workstations, desktop computers, and the like only trust other engineering laptops, workstations, desktop computers, based on the organization's policy on potential data-sharing. Additionally, AI workload processes may consume a relatively large amount of processing resources, yet the results they provide often do not require instantaneous (e.g., real-time) implementation, such as other process intensive services (e.g., video rendering services). On certain conditions and based on the local resources, it could otherwise be better to send the data to another trusted IHS within an organization group (e.g., another peer endpoint device) to perform AI workloads. However, this introduces the problem of coordinating the workload across multiple devices. Embodiments provide a solution to this problem as will be described in detail herein below.

Figure 2:
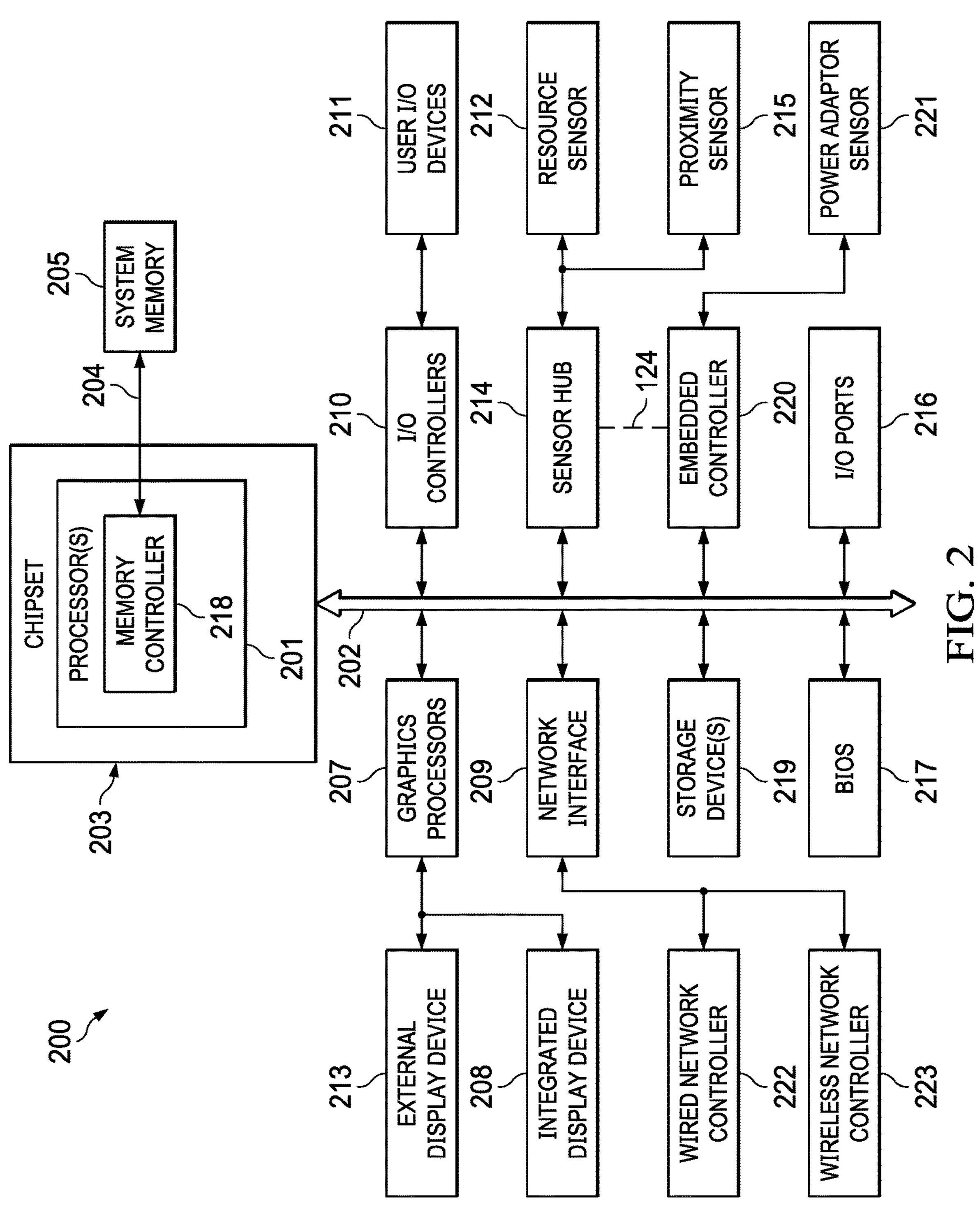
FIG. 2 is a block diagram illustrating components of an example IHS that may be configured to execute the AI workload sharing manager according to one embodiment of the present disclosure.

FIG. 2 is a block diagram illustrating components of an example IHS 200 that may be configured to execute the AI workload sharing manager according to one embodiment of the present disclosure. IHS 200 may be incorporated in whole, or part, as IHSs 102 or 104 of FIG. 1. As shown, IHS 200 includes one or more processors 201, such as a Central Processing Unit (CPU), that execute code retrieved from system memory 205. Although IHS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removable couplings with various types of external devices and systems, including removable couplings with peripheral devices that may be configured for operation by a particular user of IHS 200. For instance, I/O 216 ports may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 200. User I/O devices 211 may interface with an I/O controller 210 through wired or wireless couplings supported by IHS 200. In some cases, I/O controllers 210 may support configurable operation of supported peripheral devices, such as user I/O devices 211.

As illustrated, a variety of additional resources may be coupled to the processor(s) 201 of the IHS 200 through the chipset 203. For instance, chipset 203 may be coupled to network interface 209 that may support different types of network connectivity. IHS 200 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 200.

Chipset 203 may also provide access to one or more display device(s) 208 and 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 200.

One or more display devices 208 and 213 coupled to IHS 200 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 200 accessed via bus 202. In some cases, power to graphics processor 207, integrated display device 208 and/or external display device 213 may be turned off, or configured to operate at minimal power levels, in response to IHS 200 entering a low-power state (e.g., standby).

As illustrated, IHS 200 may support an integrated display device 208, such as a display integrated into a laptop, tablet, 2-in-1 convertible device, or mobile device. IHS 200 may also support use of one or more external display devices 213, such as external monitors that may be coupled to IHS 200 via various types of couplings, such as by connecting a cable from the external display devices 213 to external I/O port 216 of the IHS 200. In certain scenarios, the operation of integrated display devices 208 and external display devices 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 200 or may be external to IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes Basic Input/Output System (BIOS) 217 that may be stored in a non-volatile memory accessible by chipset 203 via bus 202. Upon powering or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, iOS, ANDROID, LINUX, etc.) for use by IHS 200.

BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 200 (e.g., CPU 201, GPU 207, system memory 205, etc.). In certain embodiments, sensor hub 214 may also include capabilities for determining a location and movement of IHS 200 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 200, absence from IHS 200, and/or distance from IHS 200 (e.g., near-field, mid-field, or far-field).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 200.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core functions of IHS 200, such as power management, management of operating modes in which IHS 200 may be physically configured and support for certain integrated I/O functions.

EC 220 may also implement operations for interfacing with power adapter sensor 221 in managing power for IHS 200. These operations may be utilized to determine the power status of IHS 200, such as whether IHS 200 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
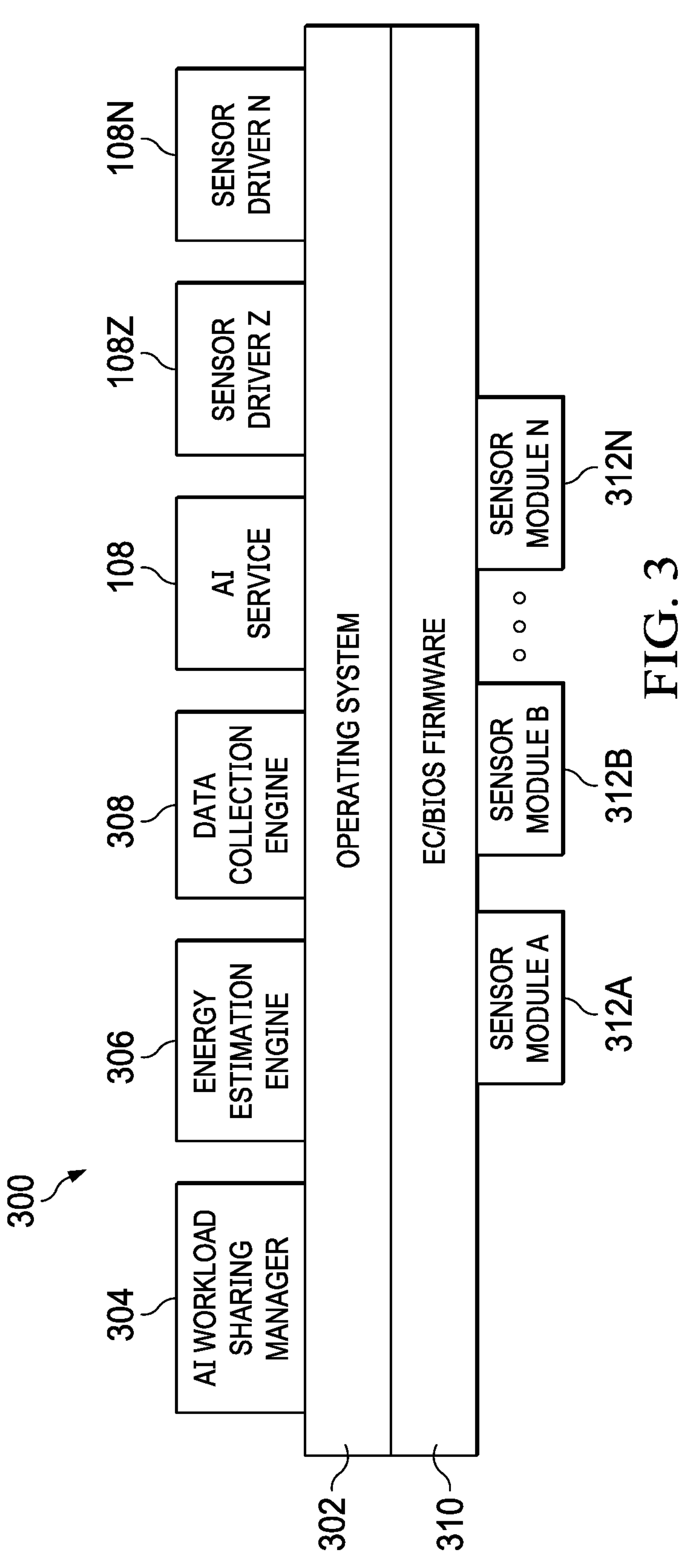
FIG. 3 is a block diagram illustrating an example of a software system produced by the target IHS for providing the AI workload sharing system according to one embodiment of the present disclosure.

FIG. 3 is a block diagram illustrating an example of a software system 300 produced by the target IHS 102 for providing the AI workload sharing system 100 according to one embodiment of the present disclosure. Although the software system 300 is described with reference to the target IHS 102, it should be appreciated that at least a portion of the software system 300 may also be implemented on the other IHSs 104 of the trusted workgroup. In some embodiments, each element of software system 300 may be provided by IHS 102 through the execution of program instructions by one or more logic components (e.g., CPU 201, BIOS 217, EC 220, etc.) stored in memory (e.g., system memory 205), storage device(s) 219, and/or firmware. As shown, software system 300 includes an operating system (OS) 302 that supports an AI workload sharing manager 304, an energy estimation engine 306, a data collection engine 308, and one or more AI services 108 that optimize the performance of each IHS 102, 104. Software system 300 may also include one or more sensor modules or drivers $312_A$-$312_N$, which may abstract and/or interface with hardware resource sensor 212, proximity sensor 215, power adapter sensor 221, and the like.

In one embodiment, AI workload sharing manager 304 may include features, or form a part of, the DELL PRECISION OPTIMIZER. The DELL PRECISION OPTIMIZER dynamically configures the IHS 102 to optimize its performance. It also keeps the user informed of any available software updates and applies them when configured to do so. Additionally, it may include a tracking subsystem that can gather data about the IHS 102 and help identify potential problems. In one embodiment, AI workload sharing manager 304 may be provided as a cloud service in which it communicates through a publicly available communication network, such as the Internet, to communicate with the IHS 102 to facilitate sharing of AI resources among multiple IHSs 102, 104. For example, the AI workload sharing manager 304 may be provided as a subscription service, in which users of IHS 102 may register for providing the AI workload sharing system such as described herein. The AI workload sharing manager 304 is executed by OS 302, which is turn supported by EC/BIOS instructions/firmware 310. EC/BIOS firmware 310 is in communications with, and configured to receive data collected by, one or more sensor modules or drivers $312_A$-$312_N$, which may abstract and/or interface with hardware resource sensor 212, proximity sensor 215, and power adapter sensor 221.

In various embodiments, software system 300 also includes an energy estimation engine 306, such as the MICROSOFT E3 engine, which is configured to provide energy usage data broken down by applications, services, tasks, and/or hardware in an IHS. In some cases, energy estimation engine 306 may use software and/or hardware sensors configured to determine, for example, whether a particular AI engine is exceeding certain target workload goals.

Data collection engine 308 may include any data collection service or process, such as, for example, the DELL DATA VAULT configured as a part of the DELL SUPPORT CENTER that collects information on system health, performance, and environment. In some cases, data collection engine 308 may receive and maintain a database or table that includes information related to IHS hardware utilization (e.g., by application, by thread, by hardware resource, etc.), power source (e.g., AC power (adapter plugged in) or battery power (adapter unplugged)), and the like. In one embodiment, both native AI service 108 and AI workload sharing manager 304 may query data collection engine 308 to, among other things, acquire data for learning the behavior of the various resources of the IHS 102.

As described herein above, current deployments of IHSs 102, 104 often include several AI services (e.g., DELL OPTIMIZER™ and DDV-SUPPORT ASSIST™, etc.) 108 that are each configured to optimize various aspects of its respective IHS. In one embodiment, AI workload sharing manager 304 includes a built-in AI service for, among other things, determining whether its AI workload 112 is to be shared and if so, selecting another IHS 104 to share that AI workload 112 with. In another embodiment, AI workload sharing manager 304 may be integrated into or otherwise function as part of one of the AI services 108. In general, each AI service 108 and/or AI workload sharing manager 304 gathers telemetry data from the resources of the IHS 102, 104, such as CPU resources, GPU resources, storage resources, communication resources (e.g., Ethernet, USB, etc.), software resources (e.g., operating system (OS), one or more applications executed on IHS, drivers, etc.), and various platform resources (e.g., communication systems, peripheral devices, power/thermal control systems, etc.), along with sensors 312 to characterize their resource utilization.

For example, AI services 108 and/or AI workload sharing manager 304 may generate one or more performance features from telemetry data gathered from energy estimation engine 306, data collection engine 308, and/or directly from sensors $\mathbf{312}_1$-$\mathbf{312}_N$ configured in IHS 102 to generate one or more profile recommendations associated with the performance of IHS 102. Once AI services 108 and/or AI workload sharing manager 304 has collected characteristics over a period of time, it may then process the collected data using statistical descriptors to extract the application performance features of the IHS 102. For example, AI services 108 and/or AI workload sharing manager 304 may monitor the resources over time to estimate its resource usage with respect to various aspects, such as which actions performed by IHS 102 cause certain resources to encounter loading, and a time period of day in which these actions are encountered. Once AI services 108 and/or AI workload sharing manager 304 has collected characteristics over a period of time, it may then process the collected data using statistical descriptors to extract the performance features associated with IHS 102. From these performance features, the AI services 108 and/or AI workload sharing manager 304 may generate profile recommendations that are used to optimize the IHS 102. AI services 108 and/or AI workload sharing manager 304 may use any suitable AI-based learning algorithm such as, for example, a Bayesian algorithm, a Linear Regression algorithm, a Decision Tree algorithm, a Random Forest algorithm, a Neural Network algorithm, or the like. The process described above for generating the performance features from the received data may be referred to as an AI workload 112.

As shown, AI workload sharing manager 304 is stored and executed on the IHS 102 it is configured to provide AI workload sharing services for. In other embodiments, AI workload sharing manager 304 may be a cloud provided service in which it communicates through a publicly available communication network, such as the Internet, to communicate with other IHSs 104 in the trusted workgroup 106 for sharing of AI workloads 112. For example, the AI workload sharing manager 304 may be provided as a subscription service, in which users and/or administrators of the trusted workgroup 106 may register for such services.

Figure 4:
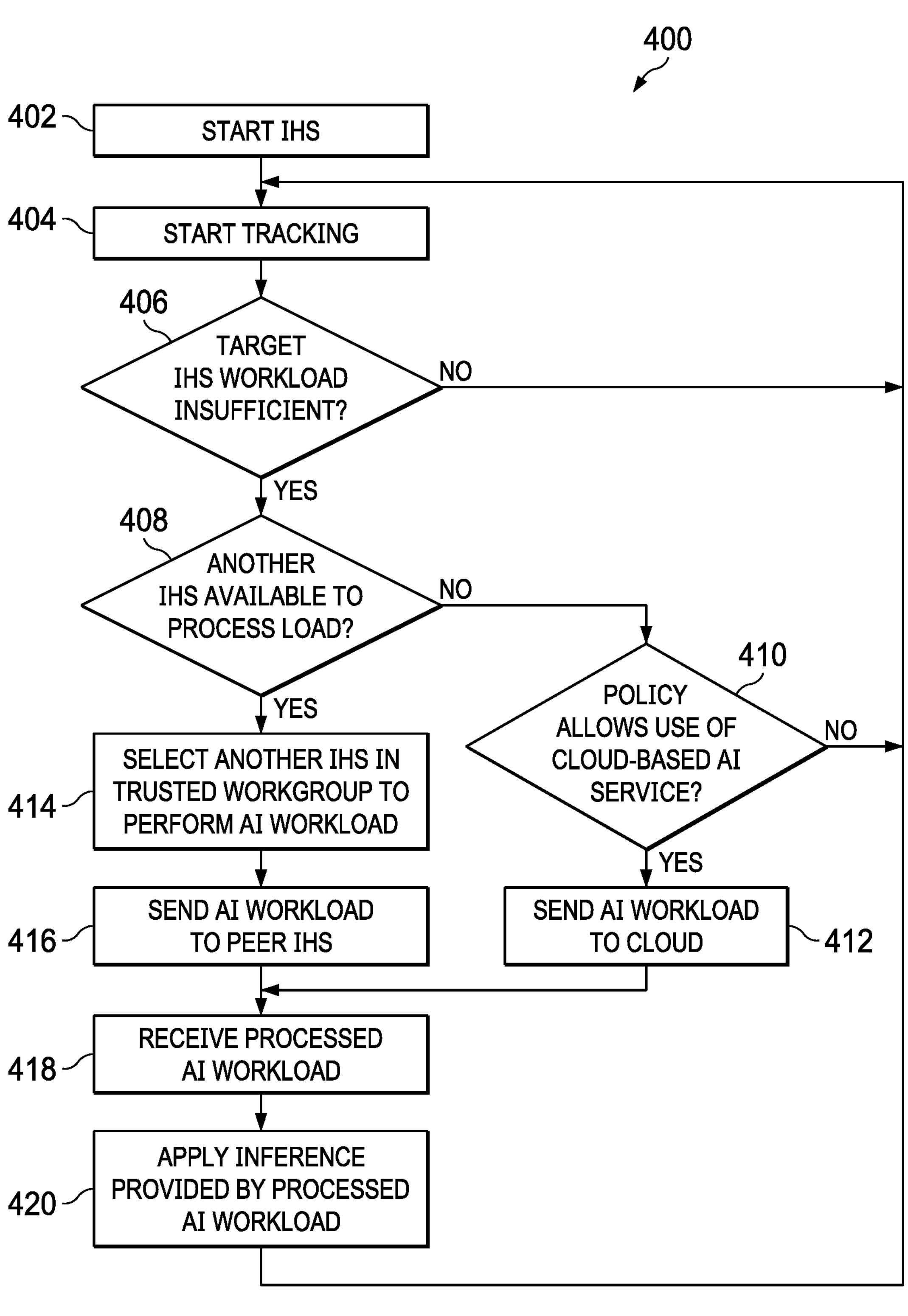
FIG. 4 is an example AI workload sharing method that may be performed by the AI workload sharing system according to one embodiment of the present disclosure.

FIG. 4 is a example AI workload sharing method 400 that may be performed by AI workload sharing system 100 according to one embodiment of the present disclosure. In some embodiments, AI workload sharing method 400 may be executed, at least in part, by operation of AI workload sharing manager 304. It should be appreciated that, although the AI workload sharing method 400 is described herein as providing a workload sharing service for a single AI service 108, other embodiments may involve providing a workload sharing service for multiple AI services 108 executed on the IHS 102, 104.

Initially at step 402, the IHS is started and used in a normal manner. At step 404, AI workload sharing method 400 starts tracking IHS 102, 104 via from telemetry data gathered from energy estimation engine 306, data collection engine 308, and/or directly from sensors $\mathbf{312}_1$-$\mathbf{312}_N$ configured in IHS 102.

At step 406, the AI workload sharing method 400 determines whether the AI workload 112 incurred by use of the AI service 108 exceeds a specified threshold. In one embodiment, the AI workload sharing method 400 may monitor a processing workload of a certain hardware accelerator resource configured in the IHS 102, 104 that performs some, most, or all of the AI workload 112, and compare its current workload level against the specified value. The threshold value may be set to any suitable value, such as one set according to user input based upon the particular configuration of the IHSs 102, 104 in the trusted workgroup 106. Additionally, the specified threshold level may be set individually for each IHS 102, 104 configured in the trusted workgroup 106. Nevertheless, if it is determined that the threshold level has not been exceeded (e.g., the current AI workload is sufficient), processing continues at step 404 for further optimization of the IHS 102, 104 using the resources in the target IHS 102; otherwise, processing continues at step 408.

In an alternative embodiment, the AI workload sharing method 400 may determine that the AI workload 112 should be shared with another IHS independently of any threshold value. For example, AI workload sharing method 400 may, using an AI service, generate a profile recommendation that estimates a future point in time in which an overall processing load of the target IHS 102 may increase to the point sharing of the AI workload 112 with another IHS 104 would be beneficial. Moreover, determining whether or not to share the AI workload 112 with another IHS 104 may be yet one more 'knob' that can be turned to further optimize operation of the target IHS 102.

At step 408, the AI workload sharing method 400 determines whether another IHS 104 is available to share the AI workload 112 of the target IHS 102. Varying techniques for determining how the AI workload sharing method 400 determines if another IHS 104 is available to accept the AI workload 112 will be described in detail herein below. If not, processing continues at step 410; otherwise, processing continues at step 414.

At step 410, the AI workload sharing method 400 determines whether a certain policy of the target IHS 102 allows the use of an AI service in the cloud, such as one provided online over the Internet. During configuration, for example, target IHS 102 may either be configured (e.g., registered) or not to use a cloud-based AI service 108 based on certain factors, such as expected security exposure, anticipated workload sharing requirements, logistics associated with maintaining a subscription to the cloud-based service, and the like. Thus, when AI workload sharing method 400 determines whether or not to allow access to the cloud-based AI service 108, it may access the policy associated with that feature to obtain the necessary information. If the AI workload sharing method 400 determines that use of the cloud-based service 116 is allowed, processing continues at step 412; otherwise, processing continues at step 404 in which the AI workload sharing method 400 continues to use the resources of the target IHS 102 for performing the AI workload 112. At step 412, the AI workload sharing method 400 sends or transmits the AI workload 112 to the cloud-based AI service 116.

At step 414, the AI workload sharing method 400 selects another IHS in the trusted workgroup 106 to perform the AI workload 112, and sends the AI workload 112 to the selected other IHS in the trusted workgroup at step 416. After a period of time in which the other IHS has completed processing of the AI workload 112, the target IHS 102 receives a processed AI workload 114 from the other IHS at step 418. Then at step 420, the target IHS 102 applies the processed AI workload 114 to optimize its performance. For example, the processed AI workload 114 may include one or more profile recommendations that may be applied to certain resources of the target IHS 102 to enhance its performance. Once the process AI workload 112 is applied to the resources of the target IHS 102, processing continues at step 402 for further shared optimization of the target IHS 102 using the AI workload sharing method 400. Nevertheless, when use of the AI workload sharing method 400 is no longer needed or desired, the process ends.

Although FIG. 4 describes one example of a method 400 that may be performed for sharing AI workloads 112 among IHSs of a trusted workgroup, the features of the disclosed AI workload sharing method 400 may be embodied in other specific forms without deviating from the spirit and scope of the present disclosure. For example, the AI workload sharing method 400 may perform additional, fewer, or different operations than those operations as described in the present example. As another example, the steps of the AI workload sharing method 400 described herein may be performed by a computing system other than the IHS 102, such as via a cloud service as described above.

Figure 5:
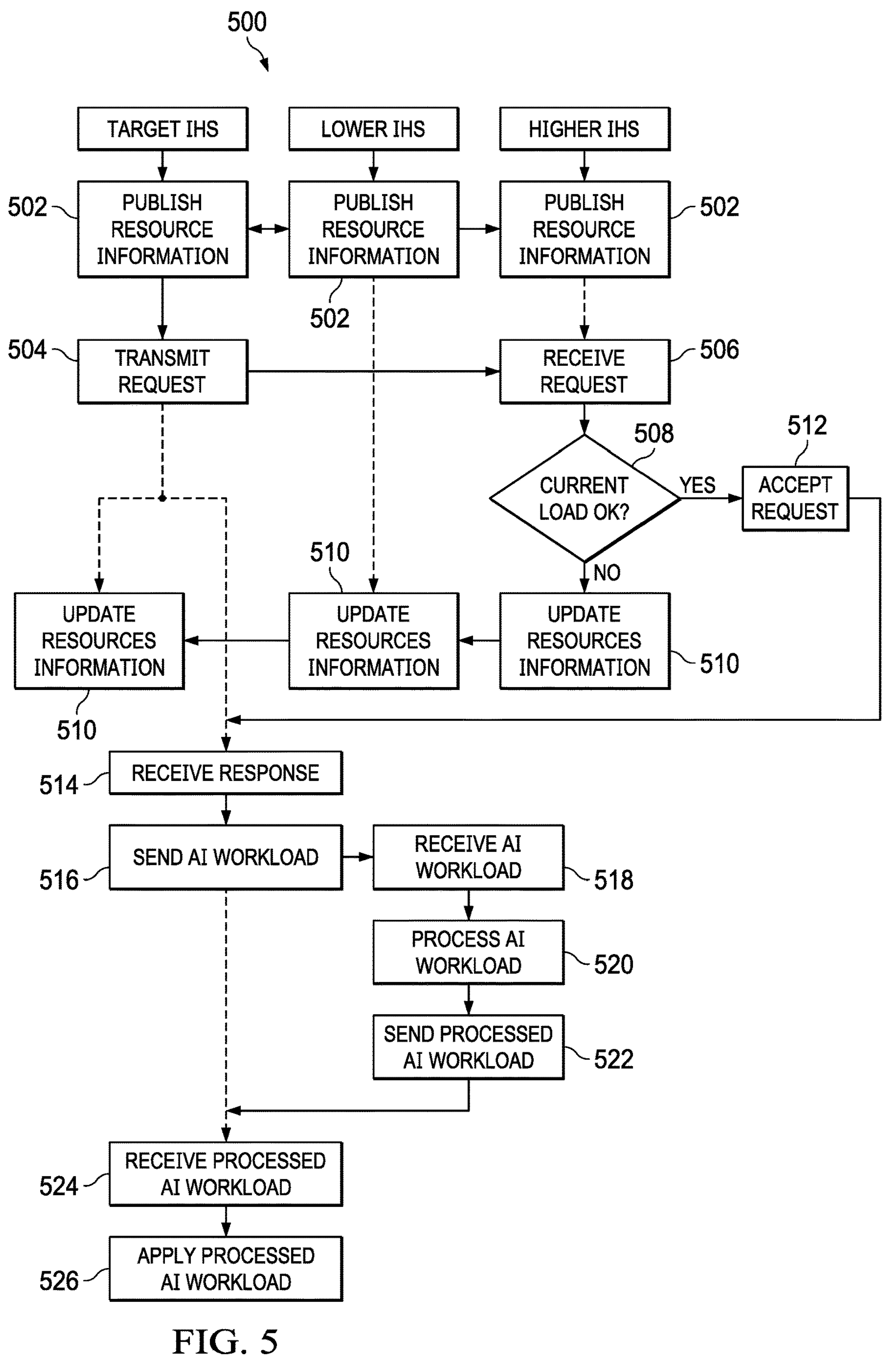
FIG. 5 illustrates a workflow diagram of an example priority-based method for selecting another IHS to share its AI workload according to one embodiment of the present disclosure.

FIG. 5 illustrates a workflow diagram of an example priority-based method 500 for selecting another IHS 104 to share its AI workload 112 according to one embodiment of the present disclosure. For example, the priority-based method 500 may describe certain details of steps 408 and 414 described above with reference to FIG. 4 in which it is determined if another IHS 104 is available to accept the AI workload 112, and how the other IHS is selected for sharing the AI workload 112. As shown, the priority-based method 500 is shown with a target IHS 102, and two other IHSs, namely a lower priority IHS 102, 104*b*, and a higher priority IHS 102, 104*c*. Nevertheless, it should be appreciated that the priority-based method 500 may be performed with any plurality of IHSs, such as four or more IHSs.

At step 502, each of the target IHS, lower priority IHS 102, 104*b* and higher priority IHS 102, 104*c* publish their own resource information to one another. For example, each IHS 102, 104 may transmit information associated with its current workload along with its available capacity to handle additional workload. Using this information received from the other IHSs, the target IHS 102 determines higher priority IHS 102, 104*c* has a relatively higher priority than lower priority IHS 102, 104*b*. In one embodiment, certain of the IHSs may publish information about certain of its resources, such as any hardware accelerators that may be configured therein. In another embodiment, before, during, or after step 502 is performed, steps 402-406 of FIG. 4 may be performed to, among other things, determine whether the target IHS should be shared with another IHS. For example, the target IHS 102 may determine that its AI workload 112 should be share with another IHS in the trusted workgroup.

At step 504, the target IHS 102 transmits a request to the higher priority IHS 102, 104*c*, and the higher priority IHS 102, 104*c* receives the request at step 506. Additionally or alternatively, the request may include information associated with an amount or size (e.g., an estimated number of instructions required) of the AI workload to be performed. The hp IHS 102, 104*c* then determines whether the additional AI workload 112 will be OK at step 508. If not, the hp IHS 102, 104*c* denies the request and issues a message to participating IHSs to update its resource information to, among other things, reflect the fact that the hp IHS 102, 104*c* rejected the request from the target IHS 102 at step 510. If, however, the hp IHS 102, 104*c* accepts the request at step 512, it issues a response message, which the target IHS 102 receives at step 514.

At step 516, the target IHS 102 sends the AI workload 112 to the hp IHS 102, 104*c*, which is received at step 518. At step 520, The hp IHS 102, 104*c* then processes the AI workload 112, and sends the processed workload 114 to the target IHS 102 at step 522. The target IHS 102 then receives the processed workload 114 at step 524, and applies the processed workload 114 to its resources at step 526. For example, steps 524 and 526 of FIG. 5 may be at least somewhat similar to steps 418 and 420 of FIG. 4.

The aforedescribed process may be repeatedly performed for sharing AI workloads 112 among one another. It should be appreciated that the IHSs used to describe the priority-based method 500 are named target IHS, lower priority IHS 102, 104*b*, and higher priority IHS 102, 104*c* to denote their role in one particular scenario, and that in other scenarios, those roles may be changed. For example, the lower priority IHS 102, 104*b* may become the target IHS 102 in the event that it needs to share its AI workload with another IHS, and that the target IHS 102 may become the higher priority IHS in the event that it has greater processing capacity. Other scenarios may apply. Nevertheless, when use of the priority-based method 500 is no longer needed or desired, the process ends.

Figure 6:
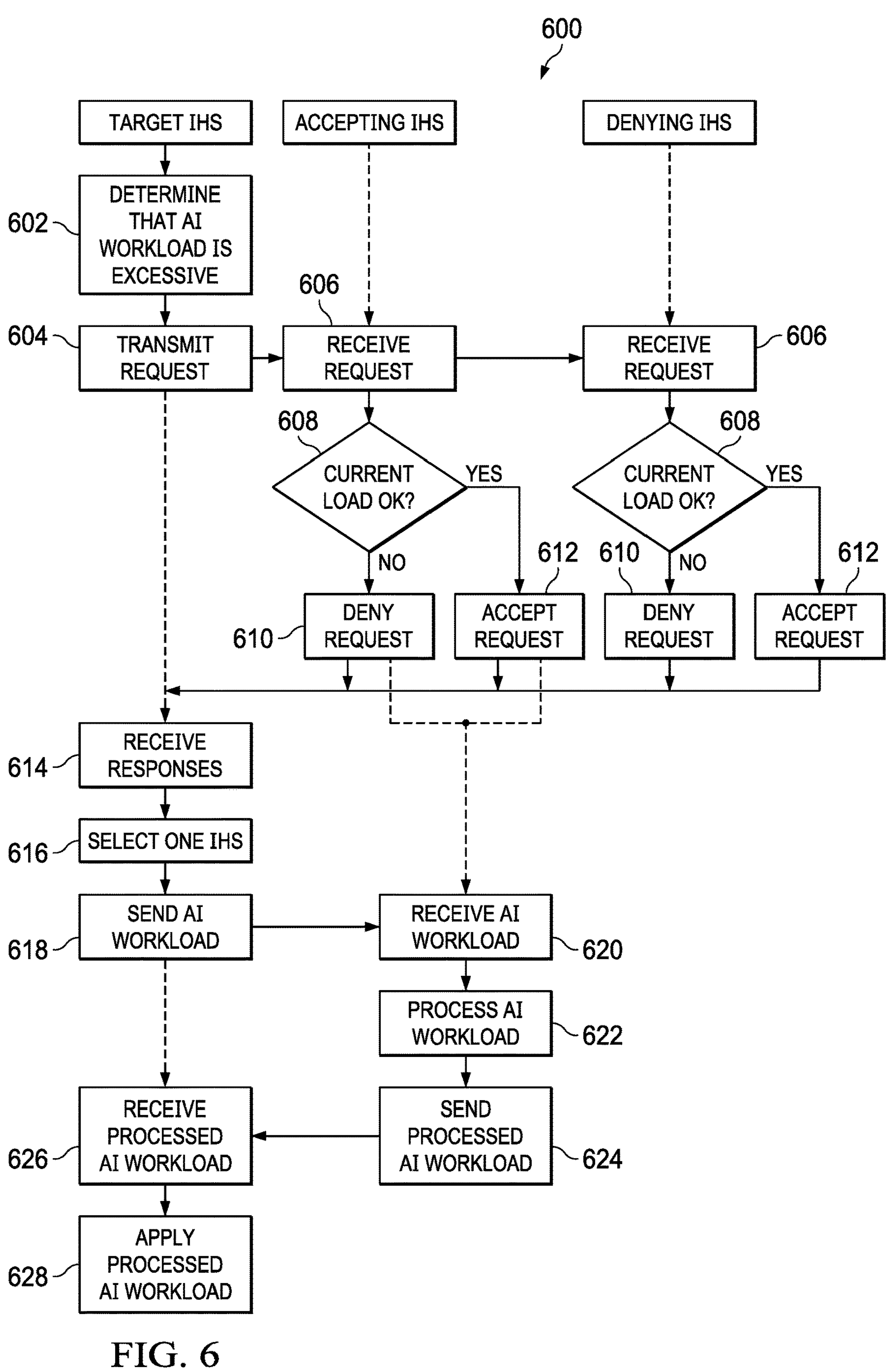
FIG. 6 illustrates a workflow diagram of an example decentralized method for selecting another IHS to share its AI workload according to one embodiment of the present disclosure.

FIG. 6 illustrates a workflow diagram of an example decentralized method 600 for selecting another IHS to share its AI workload 112 according to one embodiment of the present disclosure. For example, the decentralized method 600 may describe certain details of steps 408 and 414 described above with reference to FIG. 4 in which it is determined if another IHS 104 is available to accept the AI workload 112, and how it is selected for sharing the AI workload 112. As shown, the decentralized method 600 is shown with a target IHS 102, and two other IHSs, namely an accepting IHS 102, 104*b*, and a denying IHS 102, 104*c*. Nevertheless, it should be appreciated that the decentralized method 600 may be performed with any plurality of IHSs, such as four or more IHSs. Additionally, while the IHSs used to describe the decentralized method 600 are named target IHS, accepting IHS 102, 104*b*, and denying IHS 102, 104*c* to denote their role in one particular scenario, in other scenarios, those roles may be changed. For example, the accepting IHS 102, 104*b* may become the target IHS 102 in the event that it needs to share its AI workload with another IHS, and that the target IHS 102 may become the accepting IHS in the event that it is selected by the target IHS to share its AI workload 112. Other scenarios may apply.

At step 602, the target IHS 102 determines that its AI workload 112 is excessive. For example, step 602 may be at least somewhat similar to step 406 as described above with reference to FIG. 4 in which the target IHS 102 determines whether the AI workload 112 exceeds a specified threshold. Thereafter at step 604, the target IHS 102 transmits a request to each of the participating IHSs in the workgroup, namely the accepting IHS 102, 104*b* and the denying IHS 102, 104*c*. The request is received by each of the accepting IHS 102,

104*b* and the denying IHS 102, 104*c* at step 606, and the request is processed to determine whether it is available to handle or otherwise execute the requested AI workload 112 at step 608. In one embodiment, the request may include information associated with an amount of the AI workload 112 to be performed. Each of the accepting IHS 102, 104*b* and the denying IHS 102, 104*c* either denies the request at step 610 or accepts the request at step 612, which is then received by the target IHS 102 at step 614.

At step 616, the target IHS 102 selects one of the accepting IHS 102, 104*b* or the denying IHS 102, 104*c* for sharing its AI workload 112, which in the present scenario, would be the accepting IHS 102, 104*b*. In one embodiment, the target IHS 102 selects one of the IHSs 102, 104*b*, 104*c* that is quickest to respond to the request. That is, the target IHS 102 may select the IHS 102, 104 that is first to respond to the request. In another embodiment, the target IHS 102 selects one of the other IHSs 104*b*, 104*c* according to the one having a better resource capacity, a better use policy, or a combination thereof. For example, each IHS 102, 104*b*, 104*c* may include its available resource capacity in addition to its use policy in the response in which the target IHS 102 uses these factors to determine which IHS 102, 104*b*, 104*c* is selected. The use policy may include certain criteria associated with how it AI processing resources may be used. Examples of such use policies may include, for example, a time period of the day (e.g., morning, afternoon, evening, nighttime, between 10:00 am and 11:30 am, etc.) in which the IHS may be restricted for sharing, or allowed to share its AI processing resources, a maximum AI workload processing rate (e.g., maximum MIPS) that can be used, a type of AI service that can be shared, and the like.

At step 618, the target IHS 102 sends the AI workload 112 to the selected IHS, which in this particular scenario, is the accepting IHS 102, 104*b*. The accepting IHS 102, 104*b* receives the AI workload 112 at step 620, and processes the AI workload 112 at step 622. The accepting IHS 102, 104*b* then sends the processed workload 114 to the target IHS 102 at step 624. The target IHS 102 receives the processed workload 114 at step 626, and applies the processed workload 114 to its resources at step 628. For example, steps 626 and 628 of FIG. 6 may be at least somewhat similar to steps 418 and 420 of FIG. 4.

The aforedescribed process may be repeatedly performed for sharing AI workloads 112 among one another. Nevertheless, when use of the decentralized method 600 is no longer needed or desired, the process ends.

Although FIGS. 5 and 6 each describe example processes that may be performed by a target IHS for selecting another IHS 104 to share its AI workload 112, the various features of the disclosed processes may be embodied in other specific forms without deviating from the spirit and scope of the present disclosure. For example, the methods 500 and 600 may perform additional, fewer, or different operations than those operations as described in the present example. As another example, one or more of the steps of the process described herein may be performed by a computing system other than the target IHS 102, such as by a cloud-based service that is accessed from a publicly accessible network (e.g., the Internet).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An artificial intelligence (AI) workload sharing system comprising:
- a first Information Handling System (IHS) comprising:
  - at least one processor; and
  - at least one memory coupled to the at least one processor, the at least one memory having program instructions stored thereon that, upon execution by the at least one processor, cause the first IHS to:
    - perform at least one artificial intelligence (AI) service to optimize a performance of the first IHS by determining actions performed by the first IHS that cause certain resources to encounter loading, and a time period of day in which the actions are encountered, wherein the AI service extracts performance features associated with the first IHS based on the actions and the time of day;

in response to determining that an AI processing workload of the AI service exceeds a specified threshold, select a second IHS to perform at least a portion of the AI workload, wherein the first IHS does not perform the at least a portion of the AI workload;

transmit the at least a portion of the AI workload to the second IHS;

receive a processed AI workload from the second IHS, wherein the processed AI workload comprises one or more profile recommendations generated from the performance features; and apply the one or more profile recommendations to the first IHS.

2. The AI workload sharing system of claim 1, wherein the instructions are further executed to transmit at least a portion of the AI workload to a cloud AI service in response to determining that the second IHS cannot process the AI workload.

3. The AI workload sharing system of claim 1, wherein the instructions are further executed to determine that the AI workload of the IHS exceeds the specified threshold by obtaining a workload level of a hardware accelerator resource of the first IHS.

4. The AI workload sharing system of claim 1, wherein the first and second IHSs comprise a plurality of IHSs that are formed into a trusted workgroup that is configured in a trusted peer network.

5. The AI workload sharing system of claim 4, wherein the instructions are further executed to, for each of the plurality of IHSs, measure its own AI workload, and publish the measured AI workload to the other IHSs.

6. The AI workload sharing system of claim 5, wherein the instructions are further executed to select the second IHS due to the second IHS having an optimal AI workload capacity.

7. The AI workload sharing system of claim 6, wherein the instructions of the second IHS are further executed to re-measure its own workload while performing the AI workload, and publish the measured AI workload to the other IHSs.

8. The AI workload sharing system of claim 4, wherein the instructions are further executed to select the second IHS by:

broadcasting a request to at least a portion of the other plurality of IHSs, wherein the request comprises an amount of the AI workload;

receiving a response to the request from the second IHS, wherein the second IHS has determined that it is capable of handling the requested amount of the AI workload; and selecting the second IHS according to the response.

9. The AI workload sharing system of claim 8, wherein the instructions are further executed to select the second IHS by:

examining a measured AI workload of the second IHS, wherein the response includes the measured AI workload of the second IHS; and selecting the second IHS due to the second IHS having a better resource capacity.

10. The AI workload sharing system of claim 8, wherein the instructions are further executed to select the second IHS by being the quickest to respond to the request.

11. An artificial intelligence (AI) workload sharing method comprising:

performing by a first Information Handling System (IHS):

performing, using instructions stored in at least one memory and executed by at least one processor, at least one artificial intelligence (AI) service to optimize a performance of the first IHS by determining actions performed by the first IHS that cause certain resources to encounter loading, and a time period of day in which the actions are encountered, wherein the AI service extracts performance features associated with the first IHS based on the actions and the time of day;

in response to determining that an AI processing workload of the AI service exceeds a specified threshold, selecting, using the instructions, a second IHS to perform at least a portion of the AI workload, wherein the first IHS does not perform the at least a portion of the AI workload;

transmitting, using the instructions, the at least a portion of the AI workload to the second IHS;

receiving, using the instructions, a processed AI workload from the second IHS, wherein the processed AI workload comprises one or more profile recommendations generated from the performance features; and applying, using the instructions, the one or more profile recommendations to the first IHS.

12. The AI workload sharing method of claim 11, further comprising transmitting at least a portion of the AI workload to a cloud AI service in response to determining that the second IHS cannot process the AI workload.

13. The AI workload sharing method of claim 11, further comprising determining that the AI workload of the IHS exceeds the specified threshold by obtaining a workload level of a hardware accelerator resource of the first IHS.

14. The AI workload sharing method of claim 11, wherein the first and second IHSs comprise a plurality of IHSs that are formed into a trusted workgroup that are configured in a trusted peer network.

15. The AI workload sharing method of claim 14, further comprising for each of the plurality of IHSs, measuring its own AI workload, and publishing the measured AI workload to the other IHSs.

16. The AI workload sharing method of claim 15, further comprising selecting the second IHS due to the second IHS having an optimal AI workload capacity.

17. The AI workload sharing method of claim 14, further comprising selecting the second IHS by:

broadcasting a request to at least a portion of the other plurality of IHSs, wherein the request comprises an amount of the AI workload;

receiving a response to the request from the second IHS, wherein the second IHS has determined that it is capable of handling the requested amount of the AI workload; and selecting the second IHS according to the response.

18. The AI workload sharing method of claim 17, further comprising selecting the second IHS by:

examining a measured AI workload of the second IHS, wherein the response includes the measured AI workload of the second IHS; and selecting the second IHS due to the second IHS having a better resource capacity.

19. The AI workload sharing method of claim 17, further comprising selecting the second IHS by being the quickest to respond to the request.

20. A memory storage device having program instructions stored thereon that, upon execution by one or more processors of a first Information Handling System (IHS), cause the first IHS to:

perform at least one artificial intelligence (AI) service to optimize a performance of the first IHS by determining actions performed by the first IHS that cause certain resources to encounter loading, and a time period of day in which the actions are encountered, wherein the AI service extracts performance features associated with the first IHS based on the actions and the time of day;

in response to determining that an AI processing workload of the AI service exceeds a specified threshold, select a second IHS to perform at least a portion of the AI workload, wherein the first IHS does not perform the at least a portion of the AI workload;

transmit the at least a portion of the AI workload to the second IHS;

receive a processed AI workload from the second IHS, wherein the processed AI workload comprises one or more profile recommendations generated from the performance features; and apply the one or more profile recommendations to the first IHS.

21. The AI workload sharing system of claim 1, wherein the application of the one or more profile recommendations to the first IHS comprises applying the one or more profile recommendations to resources of the first IHS to enhance performance of the first IHS.

* * * * *